United States Patent
Henkel et al.

(10) Patent No.: US 6,682,433 B2
(45) Date of Patent: Jan. 27, 2004

(54) ARRANGEMENT OF A RUNNING ROLLER ON A COUPLING JOURNAL OF A MOVEABLE SHAFT COUPLING

(75) Inventors: Jürgen Henkel, Kernen (DE); Andreas Kollmann, Waldachtal (DE); Peter Münich, Fellbach (DE); Wolfgang Niechoj, Weinstadt (DE); Olaf Rindfleisch, Stuttgart (DE); Rolf Schröder, Stuttgart (DE); Stefan Weniger, Stuttgart (DE); Günter Wörner, Kerner (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/824,983

(22) Filed: Apr. 3, 2001

(65) Prior Publication Data

US 2001/0044341 A1 Nov. 22, 2001

(30) Foreign Application Priority Data

Apr. 4, 2000 (DE) .......................... 100 16 677

(51) Int. Cl.[7] .............................................. F16D 3/205
(52) U.S. Cl. ...................................... 464/111; 464/124
(58) Field of Search ........................ 464/111, 122–124, 464/132, 905; 384/558, 583

(56) References Cited

U.S. PATENT DOCUMENTS

| | | | | |
|---|---|---|---|---|
| 2,987,351 A | * | 6/1961 | Abele | 384/558 |
| 5,019,016 A | * | 5/1991 | Uchman | 464/111 |
| 5,199,925 A | * | 4/1993 | Welschof | 464/905 |
| 5,256,107 A | * | 10/1993 | Matsumoto et al. | 464/111 |
| 2002/0055389 A1 | * | 5/2002 | MIzukoshi et al. | 464/111 |

FOREIGN PATENT DOCUMENTS

| | | | | |
|---|---|---|---|---|
| DE | 1575585 | * | 2/1970 | ............. 384/558 |
| DE | 28 31 044 | | 10/1979 | |
| EP | 0 426 186 | | 4/1994 | |
| PL | 37083 | * | 10/1954 | ............. 384/558 |

* cited by examiner

*Primary Examiner*—Greg Binda
(74) *Attorney, Agent, or Firm*—Kenyon & Kenyon

(57) ABSTRACT

In an arrangement of a running roller on a coupling journal of a coupling half of a moveable shaft coupling, a radial rolling bearing, the inner ring of which is connected to the coupling journal by a ball joint, is inserted into the running roller. In order to maintain an additional degree of freedom for the relative movements of the coupling journal in relation to the complementary coupling half in the directions perpendicular to the central axis of the latter, either the running face of the running roller is configured cylindrically or the rolling bearing is configured as a loose bearing.

18 Claims, 6 Drawing Sheets

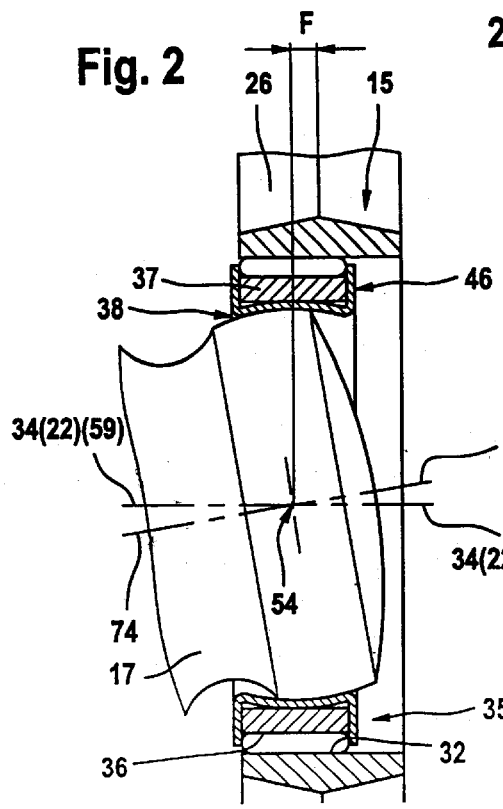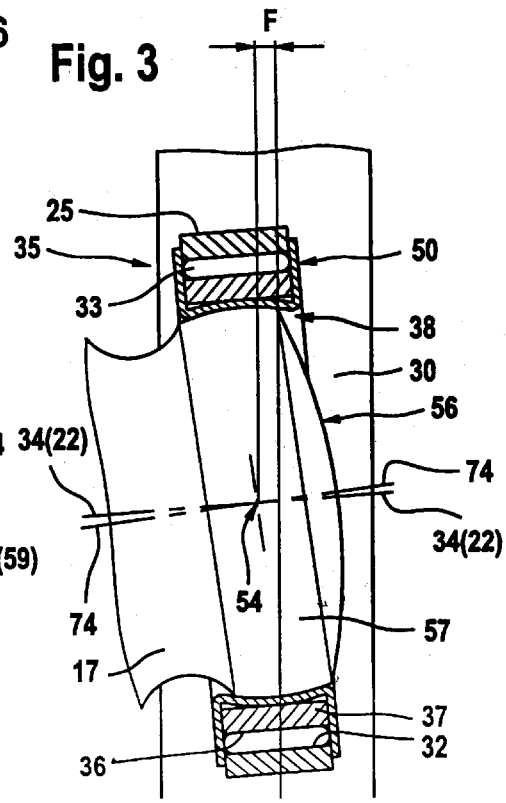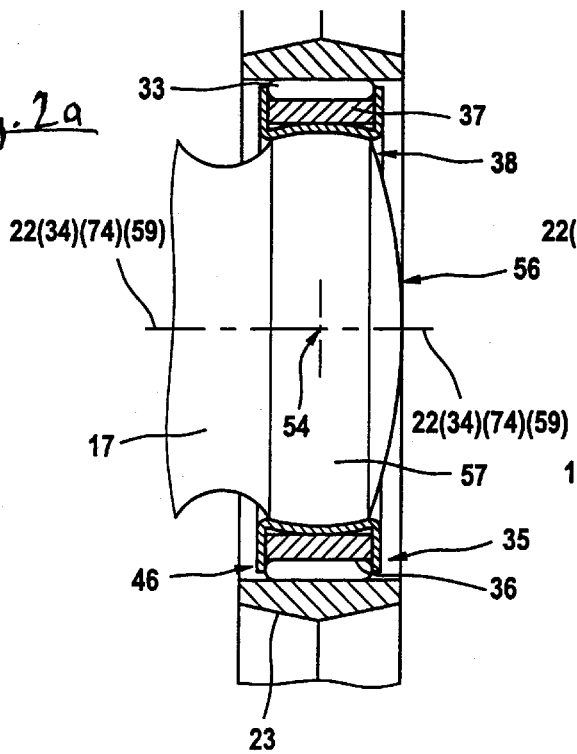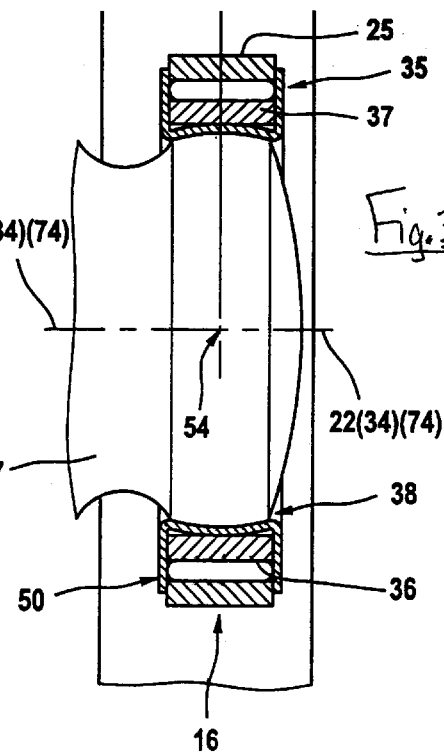

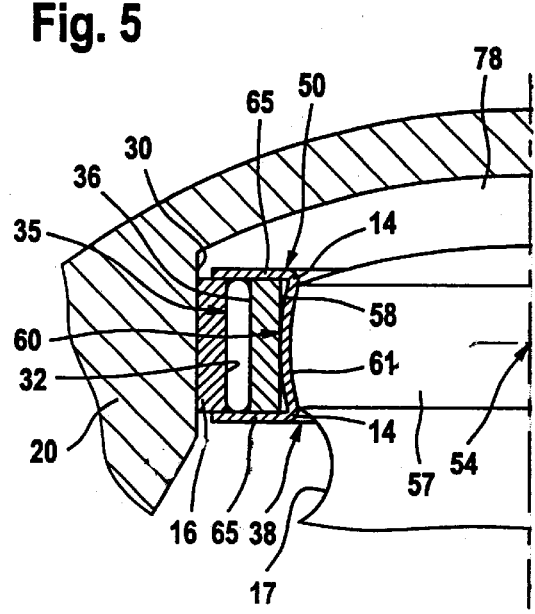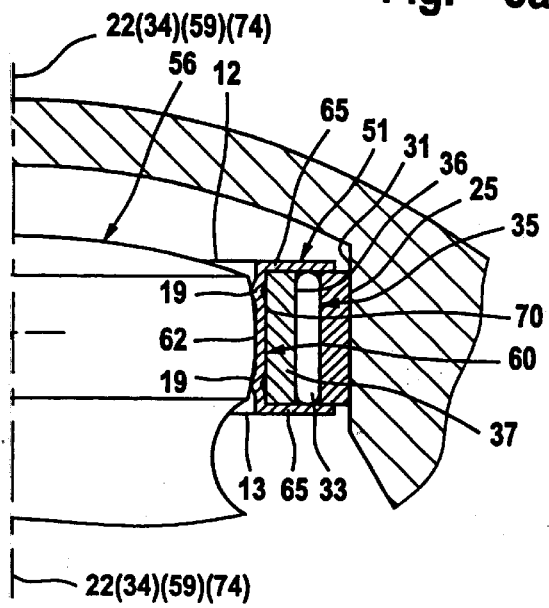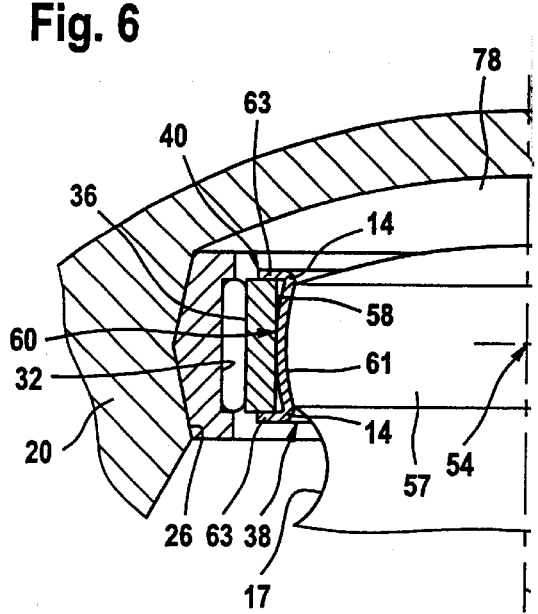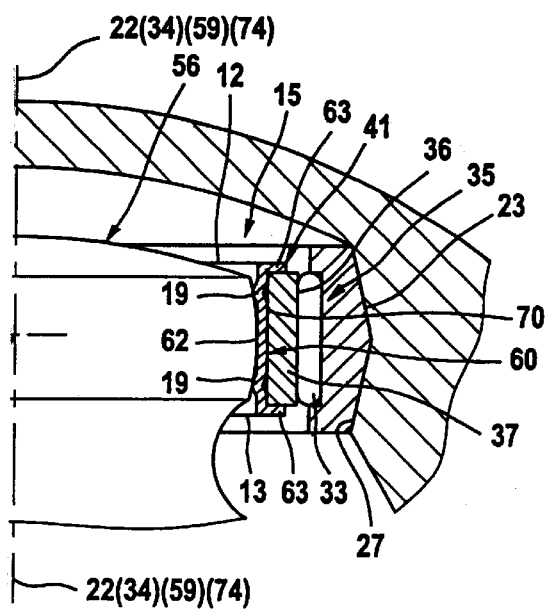

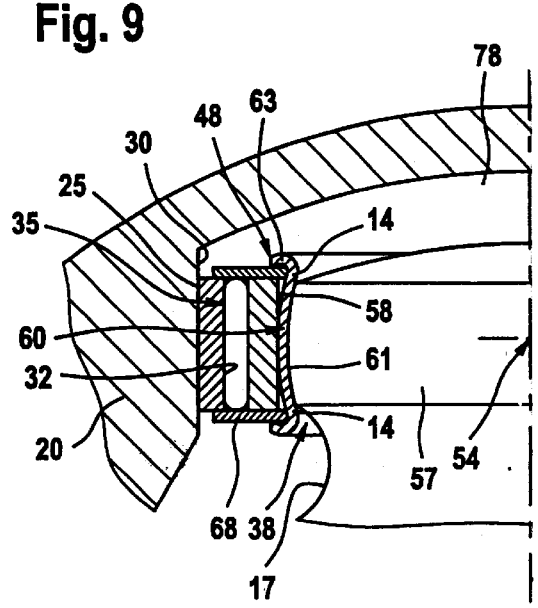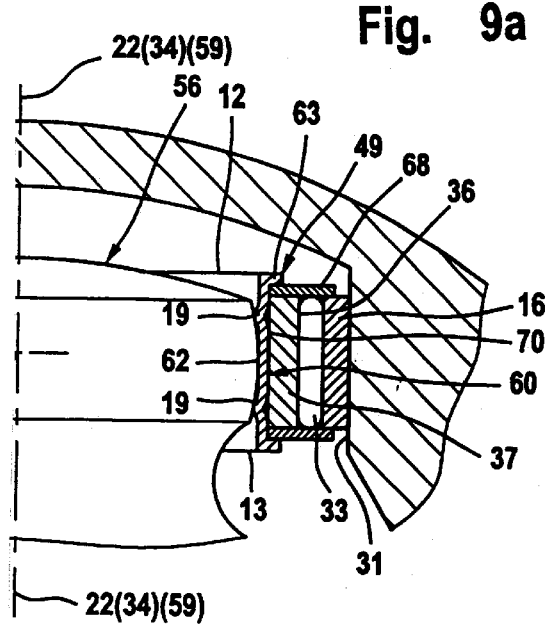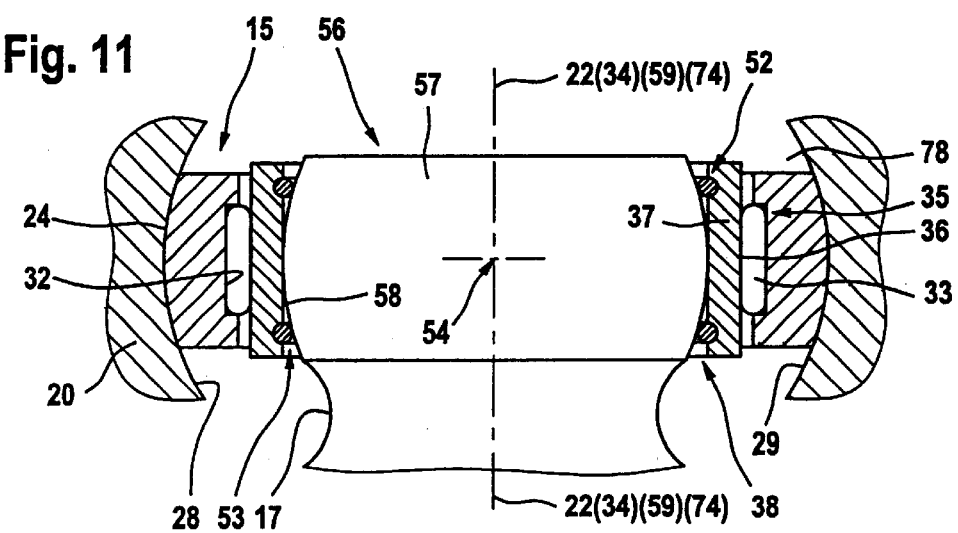

ARRANGEMENT OF A RUNNING ROLLER ON A COUPLING JOURNAL OF A MOVEABLE SHAFT COUPLING

FIELD OF THE INVENTION

The invention relates to an arrangement of a running roller on a coupling journal of a moveable shaft coupling.

BACKGROUND INFORMATION

In shaft couplings with a conventional arrangement of a running roller, it is essential that the two shafts to be coupled are capable, in relation to one another, of assuming "bending positions" of a static or dynamic type with respect to their axes of rotation and of executing axial movements, without non-uniformities in the rotational speed behaviour occurring on the shafts.

In another arrangement of the running roller as described, for example, in German Published Patent Application No. 28 31 044, the connection of the inner ring of the rolling bearing to the associated ball socket of the ball joint is configured so that the inner ring and ball joint are produced in one piece, while, in order to maintain the additional degree of freedom of the cylindrical coupling journal in relation to the complementary coupling half, the coupling journal is connected to the ball head, associated with it, of the ball joint, so as to be axially displaceable with respect to its geometric major axis, but radially immovably, so that the joint center consequently always coincides with the geometric major axis of the coupling journal. The sliding movements of the coupling journal in relation to the associated ball head, require a costly grinding or honing process in order to produce the relevant sliding faces, without it being possible to avoid completely the excitation of vibrations as a result of frictional resistances or power losses.

In another arrangement of a running roller on a coupling journal of a moveable shaft coupling, as described, for example in European Published Patent Application No. 0 426 186, the above-described disadvantages of the conventional arrangement are to be eliminated in that the inner recess, receiving the ball head, of the inner ring of the rolling bearing, is cylindrical and the ball head fixedly connected to the coupling journal is displaceable in the cylindrical inner recess radially (i.e., in the directions of the bearing axis of the rolling bearing). Thus, in this arrangement, the entire coupling moment introduced into the coupling journal is transmitted to the cylindrical face of the inner ring in a virtually pointing and sliding manner at that point on the ball face which is also exposed to the sliding displacement of the coupling journal in the directions of the bearing axis and therefore to sliding resistance during its relative movements in relation to the complementary coupling half.

It is an object of the present invention to provide an arrangement of a running roller on a coupling journal of a moveable shaft coupling, in which the vibrational excitations in the shafting which originate from frictional resistances between faces which are in sliding contact with one another are reduced.

SUMMARY

The above and other beneficial objects of the present invention are achieved by providing an arrangement as described herein.

In one example embodiment of the arrangement of a running roller according to the present invention, both axial sliding movements of the coupling journal in relation to the ball head and axial sliding movements of the ball head in relation to the inner ring are positively prevented, and, furthermore, a fraction of the relative movement necessary for maintaining the additional degree of freedom for the coupling journal in relation to the complementary coupling half is absorbed into the rolling bearing as a rolling movement of the rolling bodies. This arrangement results in a reduction in the sliding fraction of the relative movement and therefore results in a reduction in the vibrational excitation and power losses.

In the arrangement according to the present invention, the coupling journal may be connected, for example, to that joint half of the ball joint which has the concave ball face.

In the arrangement according to the present invention, the need for a separate individual joint part for the ball head may be eliminated.

In another example embodiment of the arrangement according to the present invention, it is possible to insert the ball head of the coupling journal either directly into the central orifice of the inner ring or into the central orifice of a fixing insert and to implement the axial securing of the ball head by one or two fixing inserts.

According to yet another example embodiment of the arrangement according to the present invention, the functions of the rolling-bearing-side joint half of the ball joint and of the axial fixing of said joint half in the directions of the bearing axis of the rolling bearing are integrated into the fixing insert which can be produced in its configuration by a non-fixing hobbing method, so that there is no need for cost-intensive grinding methods and the like in order to produce the joint face, in particular the ball face of this component in the arrangement according to the present invention.

In still another example embodiment of the arrangement according to the present invention, using a fixing insert, the element for configuring the joint portion and the element for fixing the complementary joint half of the coupling journal may be produced in one piece.

In a further example embodiment of the arrangement according to the present invention, using a fixing insert, the fixing insert may be secured, for example, in relation to the inner ring of the rolling bearing, in each case in one directions of the bearing axis, by a collar or by a securing ring.

The rolling bearing may be configured as a loose bearing in order to maintain the additional degree of freedom of the coupling journal for the relative movements of the latter in relation to the complementary coupling half.

The rolling bearing may also be configured with a thrust washer for the rolling bodies.

The number of individual components in the arrangement according to the present invention in the example embodiment that includes thrust washers used for the rolling bodies may be reduced.

The rolling bearing may be configured as a loose bearing for maintaining the additional degree of freedom of the coupling journal for the relative movement of the latter in relation to the complementary coupling half.

In another example embodiment of the arrangement of a running roller on a coupling journal according to the present invention, the formation of a special middle joint portion on a fixing insert is eliminated, and, instead, in each case a simple fixing insert is used for the fixing, in each case in one of the directions of the bearing axis, of the ball head of the coupling journal, the ball head at the same time being inserted directly into the central orifice of the inner ring of the rolling bearing.

BRIEF DESCRIPTION OF THE DRAWINGS

FIG. 2 is an axial cross-sectional view through the running roller according to the present invention In the first example embodiment illustrated in FIG. 1, depicted rotated clockwise through 90°, and FIG. 2a is a view, corresponding to FIG. 2, of the arrangement of the running roller according to the present invention in the first example embodiment illustrated in FIG. 1, but in which the coupling is in the straight position.

FIGS. 3 and 3a are bending and straight views, respectively, corresponding to those illustrated in FIGS. 2 and 2a, of a coupling illustrated in FIG. 1 with an arrangement of the running roller according to the present invention in a third example embodiment which is illustrated and described in more detail with reference to FIG. 5.

FIGS. 4 and 4a are axial cross-sectional views through the shaft coupling illustrated in FIG. 1, in the straight position, taken along the line IV—IV, in which FIG. 4 illustrates the first example embodiment of the arrangement according to the present invention in the left half of the section and FIG. 4a illustrates a second example embodiment of the arrangement according to the present invention in the right half of the section.

FIGS. 5 and 5a are axial cross-sectional views which correspond to those of FIGS. 4 and 4a and in which FIG. 5 illustrates a third example embodiment of the arrangement according to the present invention in the left half of the section and FIG. 5a illustrates a fourth example embodiment of the arrangement according to the present invention in the right half of the section.

FIGS. 6 and 6a are axial cross-sectional views which correspond to those of FIGS. 4 and 4a and in which FIG. 6 illustrates a fifth example embodiment of the arrangement according to the present invention in the left half of the section and FIG. 6a illustrates a sixth example embodiment of the arrangement according to the present invention in the right half of the section.

FIGS. 7 and 7a are axial cross-sectional views which correspond to those of FIGS. 4 and 4a and in which FIG. 7 illustrates a seventh example embodiment of the arrangement according to the present invention in the left half of the section and FIG. 7a illustrates an eighth example embodiment of the arrangement according to the present invention in the right half of the section.

FIGS. 8 and 8a are axial cross-sectional views which correspond to those of FIGS. 4 and 4a and in which FIG. 8 illustrates a ninth example embodiment of the arrangement according to the present invention in the left half of the section and FIG. 8a illustrates a tenth example embodiment of the arrangement according to the present invention in the right half of the section.

FIGS. 9 and 9a are axial cross-sectional views which correspond to those of FIGS. 4 and 4a and in which FIG. 9 illustrates an eleventh example embodiment of the arrangement according to the present invention in the left half of the section and FIG. 9a illustrates a twelfth example embodiment of the arrangement according to the present invention in the right half of the section.

FIG. 11 is an axial cross-sectional view through the shaft coupling illustrated in FIG. 1, in the straight position, taken along the line XI—XI, with the arrangement of the running roller according to the present invention in a thirteenth example embodiment.

DETAILED DESCRIPTION

Figure 1:
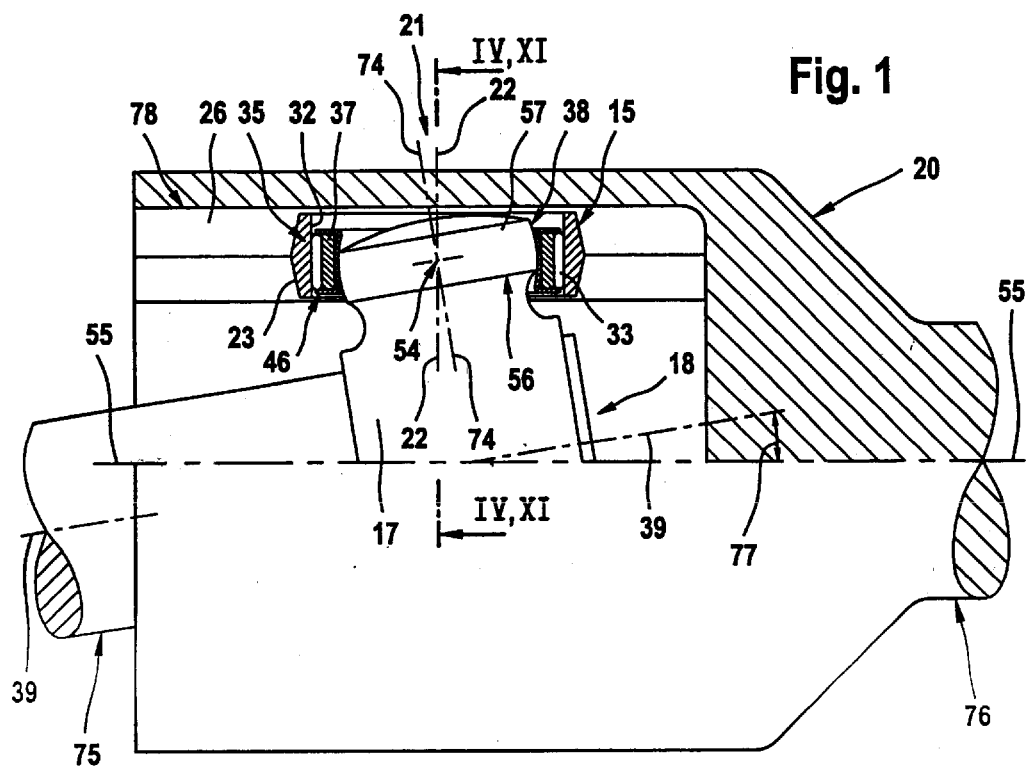
FIG. 1 is an axial cross-sectional view through a moveable shaft coupling with an arrangement of a running roller on a coupling journal of one coupling half according to the present invention, in a first example embodiment depicted in a bending position of the coupling in a plane containing both the axis of the coupling journal and the central axis of the complementary coupling half.
Figure 4:
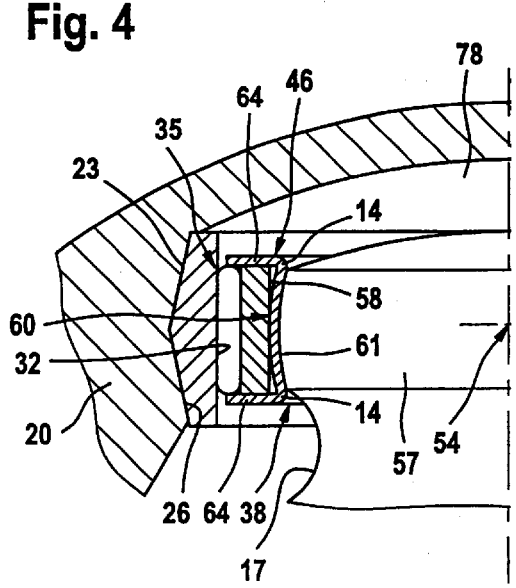

Referring first to FIGS. 1, 2 and 4, a moveable shaft coupling 21 is used for the rotationally fixed connection of two drive shafts 75 and 76 which with respect to their central axes 39—39 and 55—55 may assume a bending position forming a bending angle 77 or a straight position with their central axes being aligned coaxially.

That coupling half 18 of the shaft coupling 21 which is assigned fixedly in terms of movement to the drive shaft 75 includes at least one coupling journal 17 which is oriented with its central axis 74—74 perpendicular to the central axis 39—39 of the drive shaft 75 and which is connected rotationally and pivotably movably to a running roller 15 by a series arrangement that includes a ball joint 38 and a radial rolling bearing 35.

The complementary coupling half assigned fixedly in terms of movement to the drive shaft 76 is configured as a coupling drum 20 which has on its inner circumference, for each running roller 15, an axial groove 78 which is open to the inner circumference and of which the mid-plane contains the central axis 55—55 and of which the groove side faces, which are used as counterrunning faces 26 and 27 for the running roller 15, in each case run parallel to and are oriented symmetrically to this mid-plane.

The running roller 15 is provided on its outer circumference with a roof-shaped running face 23 which is concentric to a central axis 22—22 of said running roller and which can roll in torque-transmitting bearing contact on one of the two matching counterrunning faces 26, 27.

The running roller 15 is produced on its inner circumference in one piece with a cylindrical outer running face 32, concentric to the central axis 22—22 of said running roller, for the rolling bodies 33 (e.g., needles) of the rolling bearing 35.

When the coupling 21 is in the bending position, to maintain an additional degree of freedom F for the relative movements of the coupling journal 17 perpendicularly to the central axis 55—55 of the complementary coupling half 20, the rolling bearing 35 is configured as a loose bearing. This is achieved, in that the rolling bodies 33 are arranged movably in relation to their outer running face 32 in the directions of the bearing axis 34—34 which coincides with the central axis 22—22 of the running roller 15 in the installed position.

The rolling bearing 35 includes an inner ring 37 which is provided on its outer circumference with a cylindrical inner running face 36 for the rolling bodies 33 which is concentric to the bearing axis 34—34. The rolling bodies 33 are fixed immovably in relation to the inner running face 36 in the directions of the bearing axis 34—34, in each case by a thrust washer 64.

The thrust washers 64 are configured as a radial widening of a radial collar which is provided as a respective axial insertion end 12 and 13, extending coaxially to the bearing axis 34—34, of a sleeve-shaped fixing insert 46 and which is produced in one piece with said fixing insert. The fixing insert 46 is inserted positively and fixedly in terms of movement into the central orifice 58 of the inner ring 37, the central orifice being configured cylindrically and centrally to the bearing axis 34—34, the respective collar 64 securing the fixing insert 46 in relation to the inner ring 37 in the direction, pointing toward the inner ring 37, of a central axis 59—59 of a fixing insert 46, the central axis coinciding with the bearing axis 34—34 in the installed position. The fixing insert 46 includes, in its axially middle region, a joint portion 60 which, with its concave spherical inner generated surface 61, is configured as that joint part of the ball joint 38 which is assigned fixedly in terms of movement to the inner ring 37 and which receives the ball head 56 which has the convex ball face 57 and which is used as the joint half assigned fixedly in terms of movement to the coupling journal 17. The fixing insert 46 includes a cross-sectional shaping 14 which is provided axially between a collar 64 and a joint portion 60 and which projects centripetally in relation to the central orifice 58 of the inner ring 37 so that the ball head 56 is fixed immovably in relation to the inner ring 37 in the respective direction of the bearing axis 34—34 which points from the joint portion 60 toward the cross-sectional shaping 14. The inner generated surface 61 of the joint portion 60 and the inner generated surfaces of the cross-sectional shapings 14 merge continuously into one another to form a concave spherical overall surface. The cross-sectional shapings 14 thus ensure that the joint center 54 of the ball joint 38 remains fixed invariably in position in relation to the fixing insert 46 in the direction of the central axis 59—59 of the fixing insert 46, even when the shaft coupling 21 is in the bending positions.

Figure 4A:
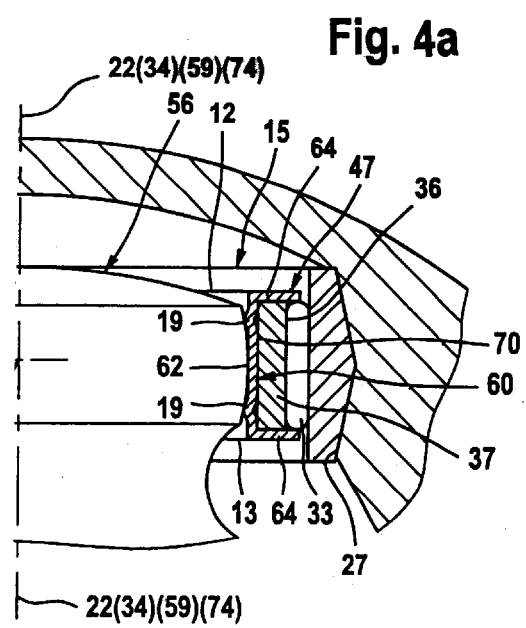

The second example embodiment of the arrangement of a running roller according to the present invention, as illustrated in FIG. 4a, differs from the first embodiment illustrated in FIG. 4 in that a fixing 47 is used, the middle joint portion 60 of which is designed cylindrically, that is to say has an outer cylindrical generated surface 70, concentric to its central axis 59—59, for its positive insertion into the central orifice 58 of the inner ring 37 and an inner cylindrical generated surface 62 concentric to its central axis 59—59, for receiving the ball head 56 of the coupling journal 17. By virtue of this cylindrical design, as a further difference from the first example embodiment illustrated in FIG. 4, the cross-sectional shapings 19 extending axially between the joint portion 60 and a collar 64 and intended for fixing the ball head 56 axially are configured in the form of an annular bead concentric to the central axis 59—59. The two example embodiments are otherwise identical, so that the same reference numerals are used for coinciding features and reference may be made to the description of the example embodiment illustrated in FIG. 4.

The third example embodiment of the arrangement of a running roller 16 according to the present invention is illustrated in FIGS. 3 and 5. The third example embodiment differs from the first example embodiment illustrated in FIG. 4 in that a fixing insert 50 for the inner ring 37 is used, in which the radial collar 65 provided on one of the insertion ends 12 and 13 extending coaxially to the central axis 59—59 of the fixing insert is configured both to form a thrust washer for the rolling body 33 of the rolling bearing 35 and, in a radial widening, to form an axial bearing disc for fixing the running roller 16 in relation to the inner ring 37 in the directions of the bearing axis 34—34. The rolling bearing 35 defines a fixed bearing for the running roller 16 also in relation to the joint center 54 of the ball joint 38 and consequently also in relation to the coupling journal 17.

When the coupling 21 is in the bending position, to maintain an additional degree of freedom F for the relative movements of the coupling journal 17 perpendicularly to the central axis 55—55 of the complementary coupling half 20, the running face 25 of the running roller 16 is configured cylindrically, and the counterrunning faces 30 and 31 of the axial groove 78 extend in a plane of the complementary coupling half 20.

The first and third example embodiments of the present invention are otherwise identical, so that the same reference numerals are used for coinciding features and reference may be made to the description of the example embodiment illustrated in FIG. 4.

The fourth example embodiment of an arrangement of a running roller 16 according to the present invention, as illustrated in FIG. 5a, differs from the third example embodiment, only in that a fixing insert 51 with a middle cylindrical joint portion 60 joined with end cross-sectional shapings 19, each in the form of an annular bead, is configured and used in the same way as the fixing insert 47 in the second example embodiment illustrated in FIG. 4a, so that the same reference numerals are provided for coinciding features and reference may be made to the description of the example embodiment illustrated in FIG. 4a.

The fifth example embodiment of the arrangement of the running roller 15 according to the present invention, as illustrated in FIG. 6, differs from the first example embodiment illustrated in FIG. 4 in that a fixing insert 40 is provided, which is secured by its respective end collar 63 in relation to the inner ring 37 in the directions of the bearing axis 34—34. The rolling bodies 33 are fixed immovably in relation to their outer running face 32 on the running roller 15 in the directions of the bearing axis 34—34.

When the coupling 21 is in the bending position, to maintain an additional degree of freedom F for the relative movement of the coupling journal 17 perpendicularly to the central axis 55—55 of the complementary coupling half 20, a rolling bearing 35 is configured as a loose bearing. Thus, the rolling bodies 33 are arranged movably in relation to their inner running face 36 on the inner ring 37 in the directions of the bearing axis 34—34.

The first and fifth example embodiments of the present invention are otherwise identical, so that the same reference numerals are provided for coinciding features and reference may be made to the description of the example embodiment illustrated in FIG. 4.

The sixth example embodiment of the arrangement of the running roller 15 according to the present invention, as illustrated in FIG. 6a, differs from the fifth example embodiment, only in that a fixing insert 41 is used, in which, as in the second example embodiment illustrated in FIG. 4a, the middle joint portion 60 is configured cylindrically and the cross-sectional shapings 19 are each configured in the form of an annular bead. The fifth and sixth example embodiments of the present invention are otherwise identical, so that the same reference numerals are used for coinciding features and reference may be made to the description of the example embodiments illustrated in FIGS. 4a and 6.

Figure 7:
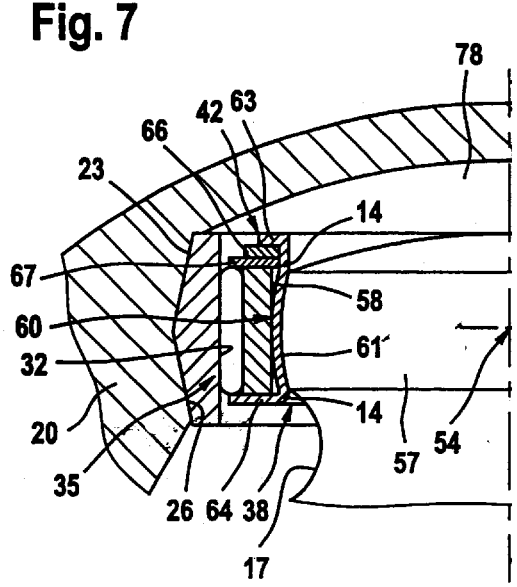

The seventh example embodiment of the arrangement of the running roller 15 according to the present invention, as illustrated in FIG. 7, differs from the first example embodiment of the present invention illustrated in FIG. 4 merely in that the rolling bodies 33 are fixed immovably, in the direction of the bearing axis 34—34 pointing from the joint portion 60 toward one insertion end 12 of the fixing insert 42 by a separate thrust washer 67 which is supported in this direction on the respective collar 63 of the fixing insert 42 via a securing ring 66 seated on this insertion end 12.

The first and seventh example embodiments of the present invention illustrated in FIGS. 4 and 7 are otherwise identical, so that the same reference numerals are used for coinciding features and reference may be made to the description of the example embodiment of the present invention illustrated in FIG. 4.

Figure 7A:
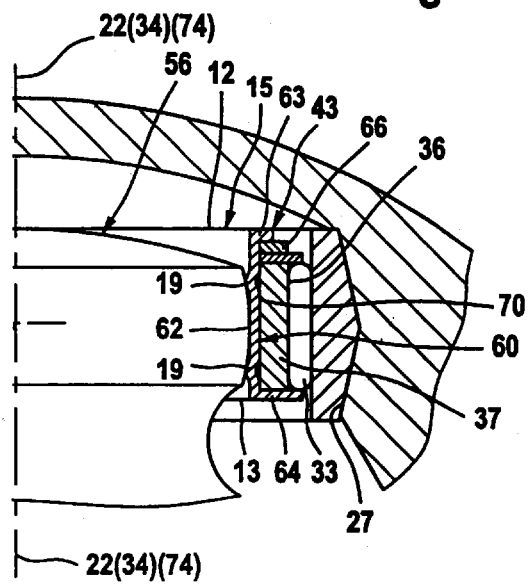

The eighth example embodiment of the arrangement of the running roller 15 according to the present invention, as illustrated in FIG. 7a, differs from the seventh example embodiment of the present invention, only in that, as in the second example embodiment of the present invention illustrated in FIG. 4a, a fixing insert 43 with a cylindrical joint portion 60 and with cross-sectional shapings 19 configured in the form of an annular bead is used.

The seventh and eighth example embodiments of the present invention are otherwise identical, so that the same reference numerals are used for coinciding features and reference may be made to the descriptions of the example embodiments illustrated in FIGS. 4a and 7.

Figure 8:
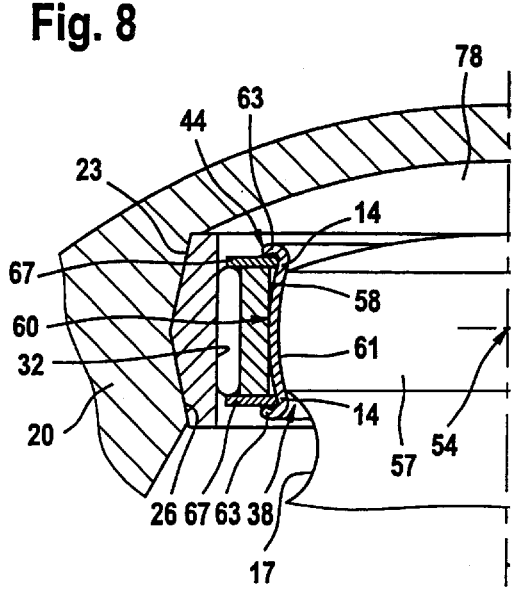

The ninth example embodiment of the arrangement of the running roller 15 according to the present invention, as illustrated in FIG. 8, differs from the seventh example embodiment illustrated in FIG. 7 merely in that the rolling bodies 33 are fixed immovably in relation to the inner ring 37, by a thrust washer 67, in the other direction of the bearing axis 34—34, pointing from the joint portion 60 toward the insertion of the end 13 of the fixing insert 44, both thrust washers 67 being axially supported directly on the respectively adjacent collar 63 of the fixing insert 44.

The seventh and ninth example embodiments of the present invention illustrated in FIGS. 7 and 8 are otherwise identical, so that the same reference numerals are used for coinciding features and reference may be made to the description of the example embodiment of the present invention illustrated in FIG. 7.

Figure 8A:
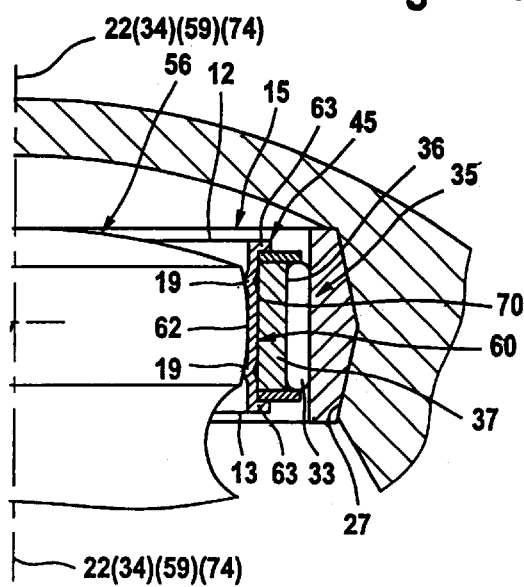

The tenth example embodiment of the arrangement of the running roller 15 according to the present invention, as illustrated in FIG. 8a, differs from the ninth example embodiment illustrated in FIG. 8, only in that, in the former, a fixing insert 45 is used in which, as in the second example embodiment illustrated in FIG. 4a, the middle joint portion 60 is configured cylindrically and the contiguous cross-sectional shapings 19 are each configured in the form of an annular bead.

The tenth and ninth example embodiments are otherwise identical, so that the same reference numerals are used for coinciding features and reference may be made to the descriptions of the example embodiments illustrated in FIGS. 4a and 8.

The eleventh example embodiment of the arrangement of the running roller 16 according to the present invention, as illustrated in FIG. 9, differs from the third example embodiment illustrated in FIG. 5, merely in that, in the former, use is made of a thrust washer 68 which is separate from the respective collar 63 of the fixing insert 48 and is widened radially to form an axial bearing washer for fixing the running roller 16 in relation to the inner ring 37 in the direction of the bearing axis 34—34 and which is supported axially on the adjacent collar 63. The third and eleventh example embodiments are otherwise identical, so that the same reference numerals are used for coinciding features and reference may be made to the description of the example embodiment illustrated in FIG. 5.

The twelfth example embodiment of the arrangement of the running roller 15 according to the present invention, as illustrated in FIG. 9a, differs from the eleventh example embodiment illustrated in FIG. 9, only in that, in the former, a fixing insert 49 is used, in which, as in the second example embodiment illustrated in FIG. 4a, the middle joint portion 60 is configured cylindrically and the contiguous cross-sectional shapings 19 are each configured in the form of an annular bead.

The eleventh and twelfth example embodiments of the present invention are otherwise identical, so that the same reference numerals are used for coinciding features and reference may be made to the descriptions of the example embodiments of the present invention illustrated in FIGS. 4a and 9.

The thirteenth example embodiment of the arrangement of the running roller 15 according to the present invention, as illustrated in FIG. 11, differs from the fifth example embodiment illustrated in FIG. 6, in that, in the former, in addition to the convex and therefore different spherical design of the outer running face 24, it is essential that the ball head 56 is inserted pivotally movably with its convex ball face 57 directly into the cylindrical central orifice 58 of the inner ring 37 and be fixed immovably in relation to the inner ring 37 in the directions of the bearing axis 34—34 by a fixing insert 52 or 53 configured in the form of a securing ring. Apart from the fact that the counterrunning faces 28 and 29 of the complementary coupling half 20 are configured concavely in the form of an arc of a circle in cross-section so as to match the running face 24, the fifth and thirteenth example embodiments of the present invention are otherwise identical, so that the same reference numerals are used for coinciding features and reference may be made to the description of the example embodiment illustrated in FIG. 6.

Figure 10A:
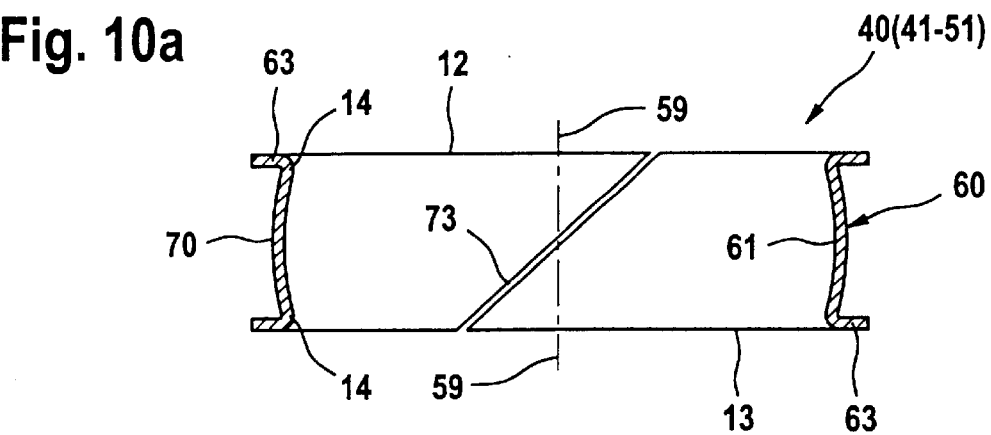
FIGS. 10 and 10a are axial cross-sectional views through the fixing insert, depicted as an individual part, of the fifth example embodiment of the arrangement according to the present invention, as illustrated in FIG. 6.
Figure 10:
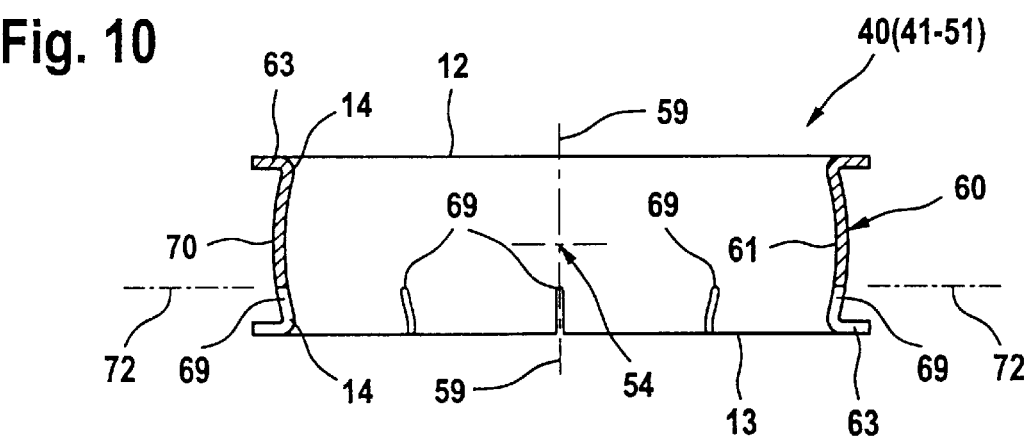

Referring to FIGS. 10 and 10a, in the fifth example embodiment of the arrangement of the running roller 15 according to the present invention, as illustrated in FIG. 6, a slotted design of the fixing insert 40 is provided. Accordingly, this fixing insert 40 includes, at its insertion end 13 extending coaxially to its central axis 59—59, slots 69 which are closed off on one side and which are arranged so as to be distributed uniformly over the circumference and are open both to the end face of the insertion end 13 and to the inner generated surface 61 and also to the outer generated surface 70 of the latter. The closed slot ends of the slots 69 are arranged in a plane 72—72 which is perpendicular to the central axis 59—59 and which intersects the fixing insert 40 as a transition between the cross-sectional shaping 14 adjacent to the insertion end 13 and the joint portion 60.

The fixing insert 40 is separated radially by a separating slot 73 which extends obliquely to the central axis 59—59 and which extends, continuously open, onto the end faces of the insertion ends 12 and 13 arranged coaxially to the central axis.

The above-described slotted configuration of the fixing insert 40 may also be adopted in one or more or in all of the above-described fixing inserts 41 to 51.

Using a slotted fixing insert, as described above, the procedure for assembling the arrangement of the running roller according to the present invention, for example in the fifth example embodiment illustrated in FIG. 6, may be such that, first, the running roller 15, the rolling bearing 35 and the fixing insert 40 are joined together to form a pre-assembled structural unit, with the slotted fixing insert 40 being clamped together radially when being inserted into the central orifice 58 of the inner ring 37. The structural unit produced in this manner may then be substantially snapped onto the ball head 56 of the coupling journal 17, with the slotted insertion end 13 of the fixing insert 40 in front.

In applications in which it is considered advantageous to use a non-slotted version of a fixing insert, the fixing insert, when being produced, may be brought, for the purpose of subsequent assembly of the arrangement of the running roller according to the present invention, into an intermediate form, in which at least one region proportionately including the joint portion and an insertion end extending coaxially to the central axis is still arranged in a straight initial state. The procedure for assembling the arrangement of the running roller according to the present invention may be such that a fixing insert, in its intermediate form, a running roller and the rolling bearing are joined together to form a pre-assembled structural unit. The ball head of the coupling journal may then be introduced into the fixing insert via the central orifice of the straight region of the intermediate form. With the ball head inserted, the straight region of the intermediate form may then be deformed plastically into its ultimate desired shape.

In all of the example embodiments of the arrangement of the running roller according to the present invention, it may be advantageous for a fraction of the relative movements of the coupling journal 17 in relation to the complementary coupling half 20 in the directions perpendicular to the central axis 55—55 of the latter to occur as a rolling movement in the rolling bearing and for no concave ball faces to have to be machined on the ball joint 38 by grinding. The respective fixing insert 40 to 51 provided with a joint portion 60 may be produced as a whole, together with its joint faces, by rolling, whereas, in the thirteenth example embodiment of the present invention illustrated in FIG. 11, with regard to the ball joint 38, neither concave ball faces are present nor axial sliding movements of the ball head 56 relative to the central orifice 58 of the inner ring 37 occur in the directions of the bearing axis 34—34.

What is claimed is:

1. A bearing arrangement, comprising:
   a movable shaft coupling having a first coupling half, the coupling half including a coupling journal and a first geometric central axis, the coupling journal including a ball joint arranged fixedly relative to the coupling journal, the ball joint being arranged fixedly relative to the first coupling half and relative to the first geometric central axis;
   a second coupling half having two parallel counter-extending faces and a third central axis;
   a radial rolling bearing having a geometric bearing axis and rolling bodies;
   a running roller arranged on the coupling journal, the running roller including a second geometric central axis, a first running face arranged concentrically to the second geometric central axis and configured for torque-transmitting engagement with one of the two parallel counter-extending faces, a second running face for engagement with the rolling bodies, an outer circumference and an inner circumference, the outer circumference being one of integral with and fixedly connected to the first running face, the inner circumference being one of integral with and fixedly connected to the second running face, the geometric bearing axis being arranged coaxially to the second geometric central axis, the second running face defining an outer running face relative to the radial rolling bearing;
   the radial rolling bearing including a sleeve-shaped inner ring having a third running face to which the rolling bodies are immovably fixed in a direction of the geometric bearing axis, the third running face defining an inner running face relative to the radial rolling bearing, the sleeve-shaped inner ring being arranged concentrically to the geometric bearing axis, the sleeve-shaped inner ring being connected to the coupling journal via the ball joint;
   a first arrangement configured to maintain a position of a joint center of the ball joint relative to the inner ring;
   a second arrangement to maintain an additional degree of freedom of relative movement between the coupling journal and the second coupling half in a direction transversely to the third central axis, the second arrangement including a loose bearing of the rolling bearing permitting relative movement between the running roller and the inner ring in a direction of the second geometric central axis.

2. The bearing arrangement according to claim 1, wherein the fixing insert is sleeve-shaped and includes a fourth central axis, a middle region of the sleeve-shaped fixing insert with respect to the fourth central axis includes a joint portion, the joint portion including an inner generated surface in accordance with the ball joint; and
   wherein the fixing insert includes two insertion ends arranged coaxially to the fourth central axis, each insertion end including a cross-sectional shaping projecting radially inwarldy relative to the central orifice of the inner ring so that the ball joint connected to the coupling journal is arranged fixedly relative to the inner ring in both directions of the geometric bearing axis.

3. The bearing arrangement according to claim 2, wherein each cross-sectional shaping includes an inner generated surface, the inner generated surface of the joint portion and the inner generated surfaces of the cross-sectional shapings define a continuous spherical surface.

4. The bearing arrangement according to claim 2, wherein the inner generated surface of the joint portion is cylindrical and each cross-sectional shaping defines an annular bead arranged concentrically to the geometric bearing axis.

5. The bearing arrangement according to claim 2, wherein the fixing insert includes a radial collar having a widened diameter provided on at least one insertion end, the radial collar being arranged coaxially to the fourth central axis, the radial collar being configured to secure the fixing insert immovably relative to the inner ring in a direction of the geometric bearing axis extending from the insertion end toward the inner ring.

6. The bearing arrangement according to claim 5, further comprising a thrust washer for the rolling bodies of the rolling bearing, the thrust washer being provided on at least one insertion end of the fixing insert between the radial collar and the inner ring.

7. The bearing arrangement according to claim 6, wherein the radial collar and the thrust washer are integrally formed.

8. The bearing arrangement according to claim 7, wherein the radial collar is formed by radial widening and further comprising an axial bearing disc configured to fix the running roller relative to one of the inner ring and the rolling bearing in a direction of the geometric bearing axis.

9. The bearing arrangement according to claim 6, wherein the rolling bodies are arranged, with respect to relative movement in the direction of the geometric bearing axis, movably relative to the outer running face.

10. The bearing arrangement according to claim 6, wherein the thrust washer is formed on the fixing insert by radial widening and further comprising an axial bearing disc configured to fix the running roller relative to one of the inner ring and the rolling bearing in a direction of the geometric bearing axis.

11. The bearing arrangement according to claim 2, wherein the fixing insert includes an outer securing ring provided on at least one insertion end, the outer securing ring being arranged coaxially to the fourth central axis and being configured to secure the fixing insert immovably relative to the inner ring in a direction of the geometric bearing axis extending from the insertion end toward the inner ring.

12. The bearing arrangement according to claim 11, further comprising a thrust washer for the rolling bodies of the rolling bearing, the thrust washer being provided on at least one insertion end of the fixing insert between the securing ring and the inner ring.

13. The bearing arrangement according to claim 2, wherein the rolling bodies of the rolling bearing are arranged with respect to relative movement in a direction of the geometric bearing axis immovably relative to the inner running face and movably relative to the outer running face.

14. The bearing arrangement according to claim 2, wherein the fixing insert includes, at one insertion end extending coaxially to the fourth central axis, a plurality of axial slots distributed over a circumference of the fixing insert, each slot being closed on one side, being open to an end face of the insertion end and being open to an inner and outer generated surface, the closed end of each slot being arranged in a plane perpendicular to the fourth central axis, the plane being disposed between the cross-sectional shaping adjacent to the insertion end and one of the joint center and the joint portion.

15. The bearing arrangement according to claim 14, wherein bearing arrangement is assembled according to a method, the method including the steps of:
   elastically radially clamping the fixing insert;
   joining the fixing insert with the rolling bearing and with the running roller to form a pre-assembled structural unit;
   relaxing the fixing insert; and
   after the relaxing step, inserting the a joint part of the coupling journal into the pre-assembled structural unit via the slotted insertion end of the fixing insert.

16. The bearing arrangement according to claim 2, wherein the fixing insert includes a separating slot extending between the insertion ends and arranged coaxially to the fourth central axis.

17. The bearing arrangement according to claim 2, wherein the bearing arrangement is assembled according to a method, the method including the steps of:
   converting the fixing insert into an intermediate form, in which at least a region that includes the joint portion and the insertion end extending coaxially to the fourth central axis remains in an straight initial state;
   joining the fixing insert in the intermediate form with the rolling bearing and the running roller to form a preassembled structural unit;
   inserting a joint part of the coupling journal into the fixing insert via the region of the intermediate form; and
   plastically deforming the region of the intermediate form into an ultimate shape after the inserting step.

18. The bearing arrangement according to claim 1, wherein the coupling journal includes a joint part having two sides, the fixing inserts being provided on the two sides of the joint part, each fixing insert being formed as a securing ring, the fixing inserts being configured to secure the joint part relative to the inner ring in one direction of the geometric bearing axis.

* * * * *

UNITED STATES PATENT AND TRADEMARK OFFICE
CERTIFICATE OF CORRECTION

PATENT NO. : 6,682,433 B2
APPLICATION NO. : 09/824983
DATED : January 27, 2004
INVENTOR(S) : Henkel et al.

It is certified that error appears in the above-identified patent and that said Letters Patent is hereby corrected as shown below:

Column 2, line 45, change "directions" to -- direction -- ;

Column 3, line 4, insert the following twenty (20) missing paragraphs:

-- In accordance with an example embodiment of the present invention, a bearing arrangement includes: a movable shaft coupling having a first coupling half, the coupling half including a coupling journal and a first geometric central axis, the coupling journal including a ball joint arranged fixedly relative to the coupling journal, the ball joint being arranged fixedly relative to the first coupling half and relative to the first geometric central axis; a second coupling half having two parallel counter-extending faces and a third central axis; a radial rolling bearing having a geometric bearing axis and rolling bodies; a running roller arranged on the coupling journal, the running roller including a second geometric central axis, a first running face arranged concentrically to the second geometric central axis and configured for torque-transmitting engagement with one of the two parallel counter-extending faces, a second running face for engagement with the rolling bodies, an outer circumference and an inner circumference, the outer circumference being one of integral with and fixedly connected to the first running face, the inner circumference being one of integral with and fixedly connected to the second running face, the geometric bearing axis being arranged coaxially to the second geometric central axis, the second running face defining an outer running face relative to the radial rolling bearing; the radial rolling bearing including a sleeve-shaped inner ring having a third running face to which the rolling bodies are immovably fixed by a one-piece radial collar in a direction of the geometric bearing axis, the third running face defining an inner running face relative to the radial rolling bearing, the sleeve-shaped inner ring being arranged concentrically to the geometric bearing axis, the sleeve-shaped inner ring being connected to the coupling journal via the ball joint; a first arrangement configured to maintain a position of a joint center of the ball joint relative to the inner ring; a second arrangement to maintain an additional degree of freedom of relative movement between the coupling journal and the second coupling half in a direction transversely to the third central axis, the second arrangement including a loose bearing of the rolling bearing permitting relative movement between the running roller and the inner ring in a direction of the second geometric central axis.

In accordance with an example embodiment of the present invention, the ball joint may include a convex ball face, the coupling journal being connected to the convex ball face.

In accordance with an example embodiment of the present invention, the coupling journal and the ball joint may be integrally formed.

UNITED STATES PATENT AND TRADEMARK OFFICE
CERTIFICATE OF CORRECTION

PATENT NO. : 6,682,433 B2
APPLICATION NO. : 09/824983
DATED : January 27, 2004
INVENTOR(S) : Henkel et al.

It is certified that error appears in the above-identified patent and that said Letters Patent is hereby corrected as shown below:

In accordance with an example embodiment of the present invention, the inner ring may include a central orifice delimited by a cylindrical generated surface concentric to the geometric bearing axis, at least one annular fixing insert being arranged concentric to the geometric bearing axis and being provided in the central orifice, the at least one annular fixing insert being secured relative to the inner ring and to the ball joint connected to the coupling journal at least in one direction of the bearing axis.

In accordance with an example embodiment of the present invention, the fixing insert maybe sleeve-shaped and may include a fourth central axis, a middle region of the sleeve-shaped fixing insert with respect to the fourth central axis include may a joint portion, the joint portion including an inner generated surface in accordance with the ball joint, and the fixing insert may include two insertion ends arranged coaxially to the fourth central axis each insertion end including a cross-sectional shaping projecting radially inwardly relative to the central orifice of the inner ring so that the ball joint connected to the coupling journal may be arranged fixedly relative to the inner ring in both directions of the geometric bearing axis.

In accordance with an example embodiment of the present invention, each cross-sectional shaping may include an inner generated surface, and the inner generated surface of the joint portion and the inner generated surfaces of the cross-sectional shapings may define a continuous spherical surface.

In accordance with an example embodiment of the present invention, the inner generated surface of the joint portion may be cylindrical, and each cross-sectional shaping may define an annular bead arranged concentrically to the geometric bearing axis.

In accordance with an example embodiment of the present invention, the fixing insert may include a radial collar having a widened diameter provided on at least one insertion end, the radial collar being arranged coaxially to the fourth central axis, the radial collar being configured to secure the fixing insert immovably relative to the inner ring in a direction of the geometric bearing axis extending from the insertion end toward the inner ring.

In accordance with an example embodiment of the present invention, the fixing insert may include an outer securing ring provided on at least one insertion end, the outer securing ring being arranged coaxially to the fourth central axis and being configured to secure the fixing insert immovably relative to the inner ring in a direction of the geometric bearing axis extending from the insertion end toward the inner ring.

UNITED STATES PATENT AND TRADEMARK OFFICE
CERTIFICATE OF CORRECTION

| | |
|---|---|
| PATENT NO. | : 6,682,433 B2 |
| APPLICATION NO. | : 09/824983 |
| DATED | : January 27, 2004 |
| INVENTOR(S) | : Henkel et al. |

It is certified that error appears in the above-identified patent and that said Letters Patent is hereby corrected as shown below:

In accordance with an example embodiment of the present invention, the rolling bodies of the rolling bearing may be arranged with respect to relative movement in a direction of the geometric bearing axis immovably relative to the inner running face and movably relative to the outer running face.

In accordance with an example embodiment of the present invention, the bearing arrangement may include a thrust washer for the rolling bodies of the rolling bearing, the thrust washer being provided on at least one insertion end of the fixing insert between the radial collar and the inner ring.

In accordance with an example embodiment of the present invention, the bearing arrangement may include a thrust washer for the rolling bodies of the rolling bearing, the thrust washer being provided on at least one insertion end of the fixing insert between the securing ring and the inner ring.

In accordance with an example embodiment of the present invention, the radial collar and the thrust washer may be integrally formed.

In accordance with an example embodiment of the present invention, the rolling bodies may be arranged, with respect to relative movement in the direction of the geometric bearing axis, movably relative to the outer running face.

In accordance with an example embodiment of the present invention, the thrust washer may be formed on the fixing insert by radial widening, and the bearing arrangement may include an axial bearing disc configured to fix the running roller relative to one of the inner ring and the rolling bearing in a direction of the geometric bearing axis. In accordance with an example embodiment of the present invention, the radial collar may be formed by radial widening, and the bearing arrangement may include an axial bearing disc configured to fix the running roller relative to one of the inner ring and the rolling bearing in a direction of the geometric bearing axis.

UNITED STATES PATENT AND TRADEMARK OFFICE
CERTIFICATE OF CORRECTION

PATENT NO. : 6,682,433 B2
APPLICATION NO. : 09/824983
DATED : January 27, 2004
INVENTOR(S) : Henkel et al.

It is certified that error appears in the above-identified patent and that said Letters Patent is hereby corrected as shown below:

In accordance with an example embodiment of the present invention, the fixing insert may include, at one insertion end extending coaxially to the fourth central axis, a plurality of axial slots distributed over a circumference of the fixing insert, each slot being closed on one side, being open to an end face of the insertion end and being open to an inner and outer generated surface, the closed end of each slot being arranged in a plane perpendicular to the fourth central axis, the plane being disposed between the cross-sectional shaping adjacent to the insertion end and one of the joint center and the joint portion. In accordance with an example embodiment of the present invention, the fixing insert may include a separating slot extending between the insertion ends and arranged coaxially to the fourth central axis.

In accordance with an example embodiment of the present invention, the bearing arrangement may be assembled according to a method including the steps of elastically radially clamping the fixing insert; joining the fixing insert with the rolling bearing and with the running roller to form a pre-assembled structural unit; relaxing the fixing insert; and after the relaxing step, inserting the a joint part of the coupling journal into the pre-assembled structural unit via the slotted insertion end of the fixing insert.

In accordance with an example embodiment of the present invention, the bearing arrangement may be assembled according to a method including the steps of: converting the fixing insert into an intermediate form, in which at least a region that includes the joint portion and the insertion end extending coaxially to the fourth central axis remains in an straight initial state; joining the fixing insert in the intermediate form with the rolling bearing and the running roller to form a pre-assembled structural unit; inserting a joint part of the coupling journal into the fixing insert via the region of the intermediate form; and plastically deforming the region of the intermediate form into an ultimate shape after the inserting step.

In accordance with an example embodiment of the present invention, the running face of the running roller may be cylindrical.

In accordance with an example embodiment of the present invention, the coupling journal may include a joint part having two sides, the fixing inserts being provided on the two sides of the joint part, each fixing insert being formed as a securing ring, the fixing inserts being configured to secure the joint part relative to the inner ring in one direction of the geometric bearing axis. --;

Column 3, line 15, change "In" to -- in --;

UNITED STATES PATENT AND TRADEMARK OFFICE
CERTIFICATE OF CORRECTION

PATENT NO.        : 6,682,433 B2
APPLICATION NO. : 09/824983
DATED             : January 27, 2004
INVENTOR(S)       : Henkel et al.

It is certified that error appears in the above-identified patent and that said Letters Patent is hereby corrected as shown below:

Column 9, line 45, change "arrangement, comprising:" to -- arrangement comprising: --;

Column 9, line 52, change "axis;" to -- axis, wherein the ball joint includes a convex ball face, the coupling journal being connected to the convex ball face; --;

Column 10, line 15, change "ring" to -- ring; and --;

Column 10, line 23, change "axis." to -- axis, wherein the inner ring includes a central orifice delimited by a cylindrical generated surface concentric to the geometric bearing axis, at least one annular fixing insert being arranged concentric to the geometric bearing axis and being provided in the central orifice, the at least one annular fixing insert being secured relative to the inner ring and to the ball joint connected to the coupling journal at least in one direction of the bearing axis. --;

Column 11, line 25, change "geometric bearing axis immovably relative to the inner" to -- geometric bearing axis --; and Column 11, line 26, change "running face and movably relative to the outer running face" to -- movably relative to the outer running face. --

Signed and Sealed this

Twenty-ninth Day of May, 2007

JON W. DUDAS
*Director of the United States Patent and Trademark Office*